United States Patent
Jarboe

(10) Patent No.: US 7,712,245 B1
(45) Date of Patent: May 11, 2010

(54) FISHING LURE HAVING A COMPOSITE WEIGHT

(75) Inventor: Joseph William Jarboe, Fort Smith, AR (US)

(73) Assignee: EBSCO Industries, Inc., Birmingham, AL (US)

( * ) Notice: Subject to any disclaimer, the term of this patent is extended or adjusted under 35 U.S.C. 154(b) by 0 days.

(21) Appl. No.: 11/876,167

(22) Filed: Oct. 22, 2007

(51) Int. Cl.
*A01K 85/01* (2006.01)

(52) U.S. Cl. .................................. 43/42.31; 43/42.39

(58) Field of Classification Search ................ 43/42.31, 43/42.39
See application file for complete search history.

(56) References Cited

U.S. PATENT DOCUMENTS

| | | | | |
|---|---|---|---|---|
| 1,394,313 | A | * | 10/1921 | Leeper ........................ 43/42.39 |
| 1,870,559 | A | * | 8/1932 | Drake .......................... 43/42.31 |
| 1,892,892 | A | * | 1/1933 | Jamar, Jr. ..................... 43/42.39 |
| 1,993,798 | A | * | 3/1935 | Peterson ...................... 43/42.39 |
| 2,007,045 | A | * | 7/1935 | Francis ........................ 43/42.39 |
| 2,511,138 | A | * | 6/1950 | Wood .......................... 43/42.35 |
| 2,563,282 | A | * | 8/1951 | Schenck ...................... 43/42.39 |
| 2,568,488 | A | * | 9/1951 | Cummins ................... 43/42.39 |
| 2,613,471 | A | * | 10/1952 | Traycik ....................... 43/42.31 |
| 2,741,056 | A | * | 4/1956 | Sullivan et al. ............. 43/42.31 |
| 2,741,864 | A | * | 4/1956 | Shotton ....................... 43/42.31 |
| 2,763,954 | A | * | 9/1956 | Bunker ........................ 43/42.31 |
| 2,832,169 | A | * | 4/1958 | Clapp .......................... 43/42.31 |
| 2,862,325 | A | * | 12/1958 | Magnus ...................... 43/42.39 |
| 2,909,863 | A | * | 10/1959 | Rector et al. ................ 43/42.31 |
| 2,927,391 | A | * | 3/1960 | Herter .......................... 43/17.1 |
| 3,035,368 | A | * | 5/1962 | Collins ........................ 43/42.39 |
| 3,040,462 | A | * | 6/1962 | Guida .......................... 43/42.31 |
| 3,044,207 | A | * | 7/1962 | Dorsett ........................ 43/42.31 |

(Continued)

FOREIGN PATENT DOCUMENTS

JP 09163898 A * 6/1997

(Continued)

OTHER PUBLICATIONS

The web page for Halco Tackle Company located at http://www.halcotackle.com.

(Continued)

*Primary Examiner*—Darren W Ark
(74) *Attorney, Agent, or Firm*—Smith Gambrell & Russell LLP

(57) ABSTRACT

A fishing lure includes a substantially hollow body with a composite weight pivotally positioned therein for generating a sound to attract fish to the fishing lure when it is retrieved in water. The body includes two side walls having a forward end and a rearward end. The side walls define at least two chambers within the body that are separated by an interior partition. The weight includes a tungsten knocking member cylindrical head member and a foot, with a lead base member substantially surrounding the foot. The weight has at least three sides, with one of the sides providing a base rocking surface that is opposite the tungsten knocking member. The composite weight is pivotally positioned on the base rocking surface in one of the hollow regions, such that when the fishing lure is retrieved in water, the weight will pivot from side to side within the body so that the tungsten knocker member intermittently engages the side walls to generate the desired sound and vibration to attract fish.

15 Claims, 3 Drawing Sheets

U.S. PATENT DOCUMENTS

| | | | | |
|---|---|---|---|---|
| 3,069,801 A * | 12/1962 | Mills | | 43/42.39 |
| 3,108,390 A * | 10/1963 | Knight | | 43/42.39 |
| 3,141,255 A * | 7/1964 | Randall | | 43/42.39 |
| 3,393,466 A * | 7/1968 | Le Master | | 43/42.39 |
| 3,497,987 A * | 3/1970 | Perrin | | 43/42.39 |
| 3,500,576 A * | 3/1970 | Ostrom | | 43/42.39 |
| 3,535,812 A * | 10/1970 | Crecelius | | 43/17.6 |
| 3,585,749 A * | 6/1971 | Dieckmann | | 43/42.03 |
| 3,626,628 A * | 12/1971 | Weimer | | 43/42.22 |
| 3,831,307 A * | 8/1974 | Pittman | | 43/42.31 |
| 3,848,353 A * | 11/1974 | McClellan | | 43/42.31 |
| 3,894,350 A * | 7/1975 | Parker | | 43/42.31 |
| 3,896,580 A * | 7/1975 | Williams, Jr. | | 43/42.31 |
| 3,908,298 A * | 9/1975 | Strader | | 43/42.31 |
| 3,909,973 A * | 10/1975 | Fairbanks | | 43/42.31 |
| 3,909,974 A * | 10/1975 | Kent | | 43/42.31 |
| 3,979,853 A * | 9/1976 | Storm et al. | | 43/42.31 |
| 4,045,903 A * | 9/1977 | Parker | | 43/42.31 |
| 4,073,084 A * | 2/1978 | Favron | | 43/42.39 |
| 4,098,017 A * | 7/1978 | Hall | | 43/42.31 |
| 4,155,191 A * | 5/1979 | Spivey | | 43/42.31 |
| 4,223,469 A * | 9/1980 | Luz | | 43/42.31 |
| 4,287,679 A * | 9/1981 | Klotz | | 43/42.31 |
| 4,380,132 A * | 4/1983 | Atkinson | | 43/42.31 |
| 4,432,156 A | 2/1984 | Gowing | | |
| 4,432,157 A * | 2/1984 | Gowing | | 43/42.31 |
| 4,483,091 A * | 11/1984 | Norlin | | 43/42.31 |
| 4,571,874 A * | 2/1986 | Smaw | | 43/4.5 |
| 4,646,463 A * | 3/1987 | Koch | | 43/42.31 |
| 4,712,326 A | 12/1987 | Hoover et al. | | |
| 4,744,169 A * | 5/1988 | Nochta | | 43/42.31 |
| 4,761,910 A * | 8/1988 | Ninomiya | | 43/42.31 |
| 4,791,750 A * | 12/1988 | Gammill | | 43/42.31 |
| 4,823,497 A * | 4/1989 | Pierce | | 43/42.31 |
| 5,134,799 A * | 8/1992 | Trnka | | 43/42.31 |
| 5,144,765 A * | 9/1992 | Keeton | | 43/42.31 |
| 5,201,784 A * | 4/1993 | McWilliams | | 43/42.31 |
| 5,259,151 A * | 11/1993 | Wicht | | 43/42.31 |
| 5,329,721 A * | 7/1994 | Smith | | 43/42.22 |
| 5,381,622 A * | 1/1995 | Tregre | | 43/42.31 |
| 5,517,782 A * | 5/1996 | Link et al. | | 43/42.31 |
| 5,561,938 A * | 10/1996 | Kato et al. | | 43/42.31 |
| 5,588,247 A * | 12/1996 | Wicht | | 43/42.31 |
| 5,600,916 A * | 2/1997 | Smith | | 43/42.31 |
| 5,661,922 A * | 9/1997 | Bonomo | | 43/42.31 |
| 5,822,912 A * | 10/1998 | Kato et al. | | 43/42.31 |
| 5,946,847 A * | 9/1999 | North | | 43/42.31 |
| 5,992,084 A * | 11/1999 | Kitagawa | | 43/42.31 |
| 6,155,000 A * | 12/2000 | Ravencroft | | 43/42.31 |
| 6,671,996 B1 * | 1/2004 | Ito | | 43/42.31 |
| 6,718,684 B2 * | 4/2004 | Yong-Set | | 43/42.39 |
| 6,840,001 B1 * | 1/2005 | Cox | | 43/42.31 |
| 6,904,712 B1 * | 6/2005 | Gironda | | 43/42.39 |
| 6,912,808 B1 * | 7/2005 | Mak | | 43/42.39 |
| 7,028,430 B2 * | 4/2006 | Gironda | | 43/42.39 |
| 7,310,906 B1 * | 12/2007 | Woller, Sr. | | 43/42.31 |
| 7,325,357 B2 * | 2/2008 | Wiskur | | 43/42.31 |
| 7,562,489 B2 * | 7/2009 | Turner | | 43/42.39 |
| 7,627,979 B2 * | 12/2009 | Huddleston | | 43/42.39 |
| 2005/0034349 A1 * | 2/2005 | Dugger, II | | 43/17.1 |
| 2005/0039374 A1 * | 2/2005 | Reed | | 43/42.39 |
| 2005/0120613 A1 * | 6/2005 | Pack | | 43/42.39 |
| 2005/0223620 A1 * | 10/2005 | Pixton | | 43/42.31 |
| 2006/0168875 A1 * | 8/2006 | Brzozowski | | 43/42.39 |
| 2006/0174535 A1 * | 8/2006 | Beer et al. | | 43/42.31 |
| 2007/0193106 A1 * | 8/2007 | Gregory | | 43/42.39 |
| 2008/0000142 A1 * | 1/2008 | Pixton | | 43/42.31 |
| 2008/0104878 A1 * | 5/2008 | Woller | | 43/42.31 |
| 2008/0256840 A1 * | 10/2008 | Rodriguez | | 43/42.31 |
| 2008/0313948 A1 * | 12/2008 | Lewis | | 43/42.39 |
| 2009/0071057 A1 * | 3/2009 | Hoyt | | 43/42.31 |
| 2009/0084021 A1 * | 4/2009 | Bialobrzeski et al. | | 43/42.31 |

FOREIGN PATENT DOCUMENTS

| | | | | |
|---|---|---|---|---|
| JP | 10191839 A | * | 7/1998 | |
| JP | 11253071 A | * | 9/1999 | |
| JP | 2001045920 A | * | 2/2001 | |
| JP | 2001231407 A | * | 8/2001 | |
| JP | 2002119175 A | * | 4/2002 | |
| JP | 2002218865 A | * | 8/2002 | |
| JP | 2003219765 A | * | 8/2003 | |
| JP | 2003219766 A | * | 8/2003 | |
| JP | 2005210951 A | * | 8/2005 | |
| JP | 2005333890 A | * | 12/2005 | |

OTHER PUBLICATIONS

Photograph of the Yo-Zuri Lure/Crankbait (Arms Series) F307-TM (attached as Exhibit A).

1999 PRADCO Outdoor Brands catalog with p. 26 advertising the Super Spot (Exhibit B), a diagram of the Super Spot bait with the weight amounts redacted (Exhibit C), and a photograph of the weight used in the lure (Exhibit D).

* cited by examiner

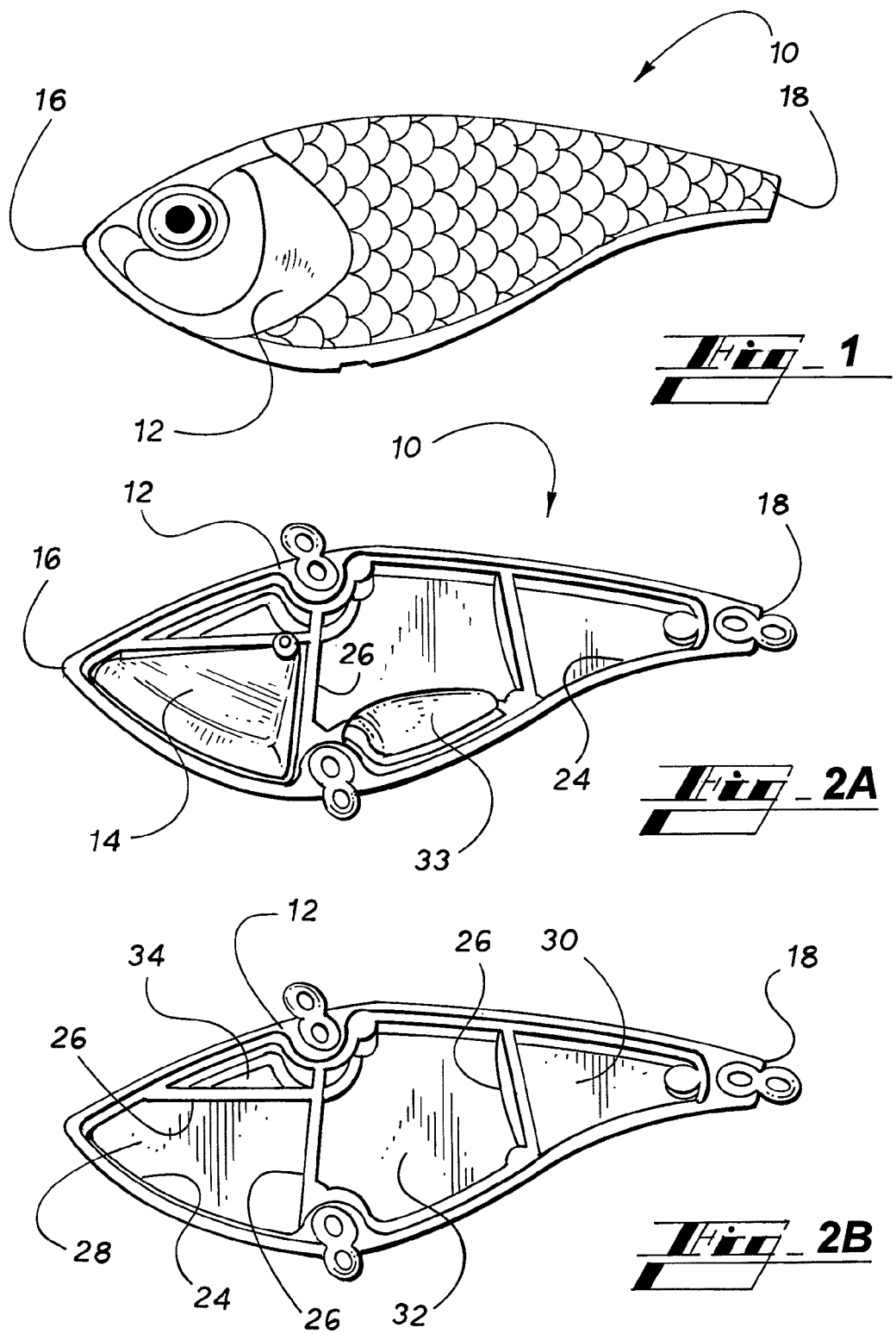

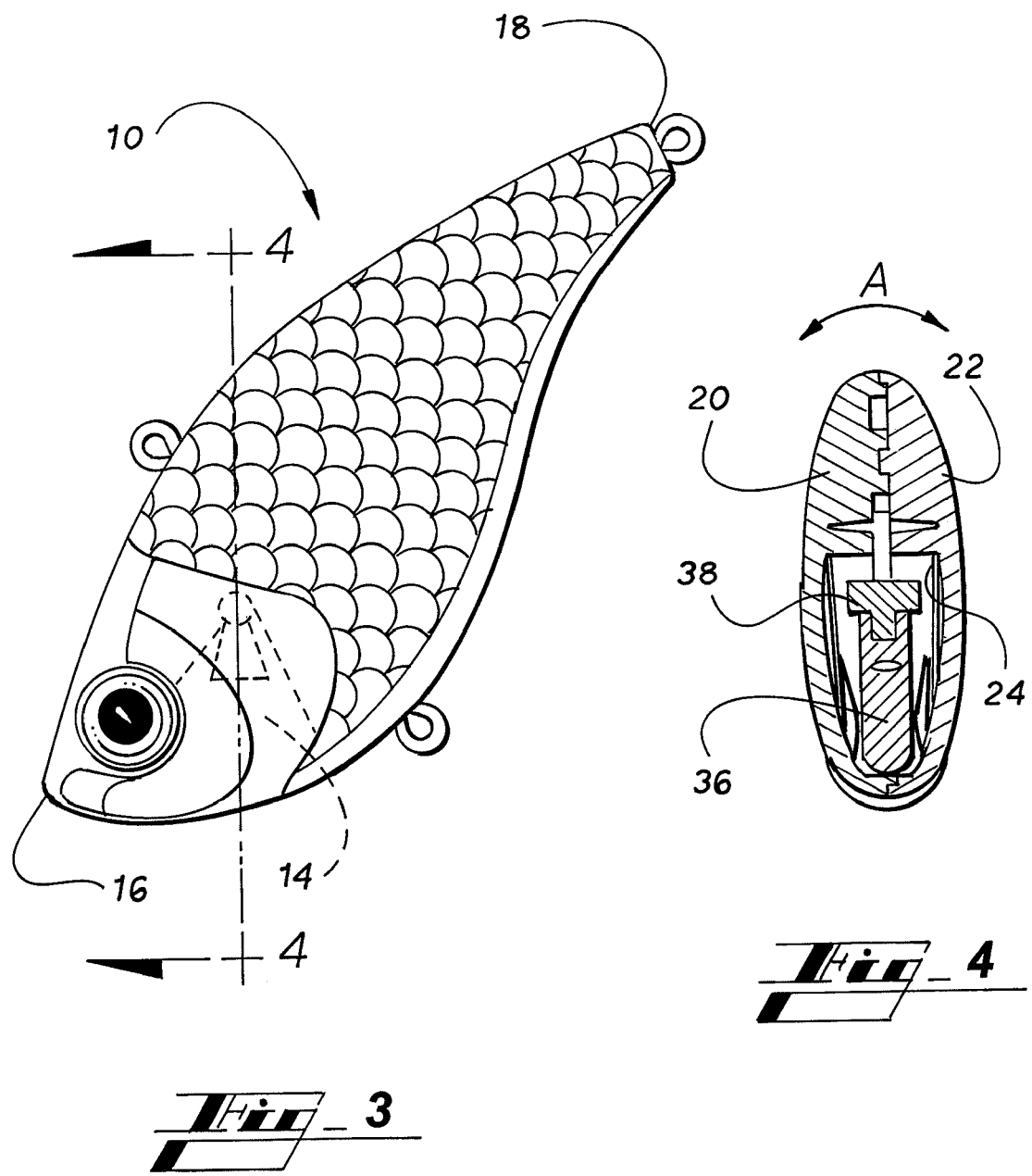
Fig_3
Fig_4

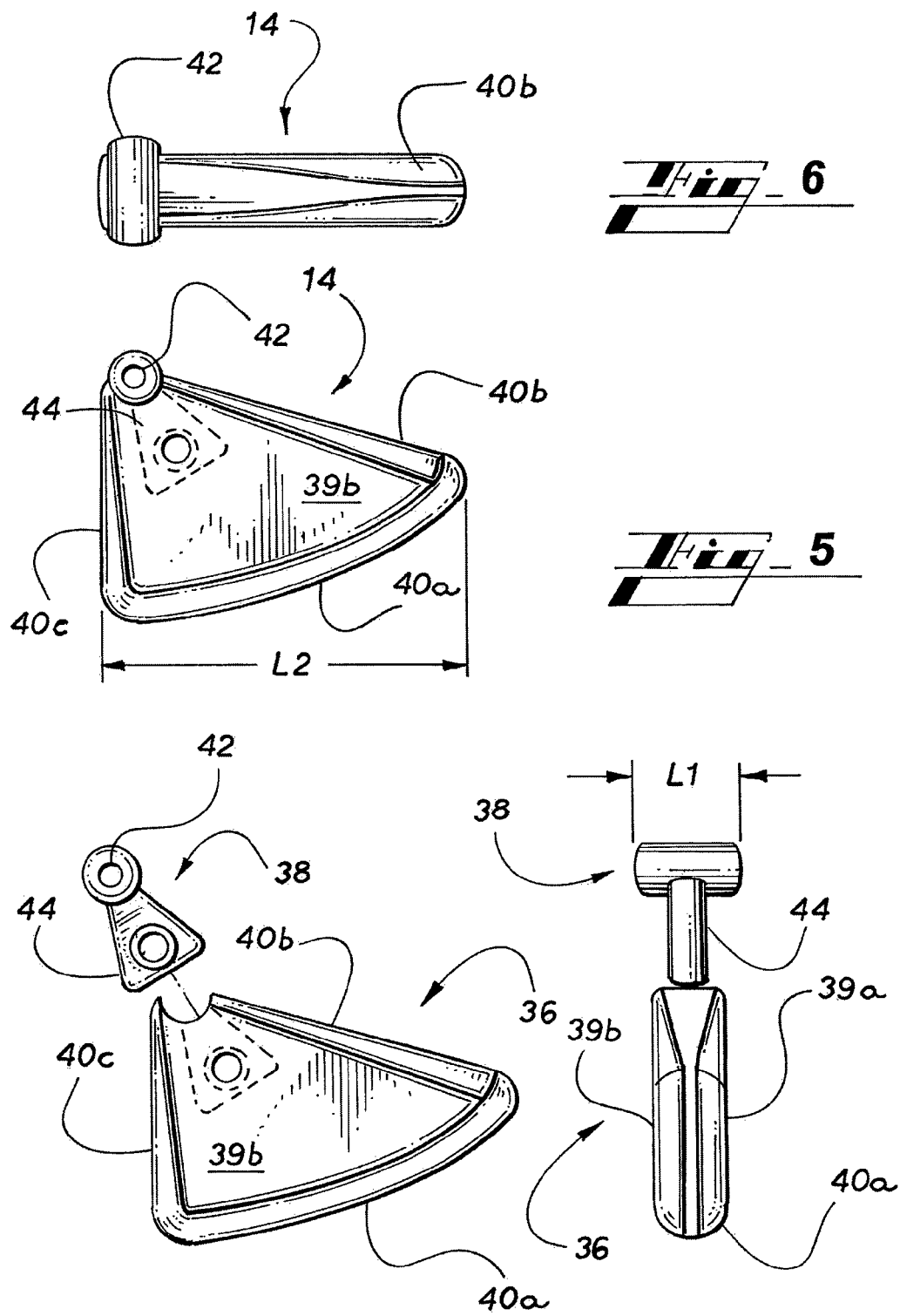

FISHING LURE HAVING A COMPOSITE WEIGHT

FIELD OF THE INVENTION

This invention relates to fishing lures, and more specifically, fishing lures having a hybrid weight for generating a desired sound.

BRIEF SUMMARY OF THE INVENTION

A fishing lure includes a composite or hybrid weight that is used to produce a desired sound for attracting fish when retrieved in water. The fishing lure has a substantially hollow body with the composite weight pivotally positioned therein for generating the desired sound to attract fish to the fishing lure. The body includes two side walls, which are substantially mirror images of each other, having a forward end and a rearward end. The side walls define at least a front hollow region or chamber and a rear hollow region or chamber within the body, with the regions being separated by an interior partition. The composite weight is positioned in the front hollow region to generate the desired sound.

The composite weight includes a tungsten knocking member cylindrical head member and a foot, with a lead base member substantially surrounding the foot. The composite weight has at least three sides, with one of the sides providing a base rocking surface that is opposite the tungsten knocking member. The composite weight is pivotally positioned on the base rocking surface in one of the hollow regions, such that when the fishing lure is retrieved in water, the weight will pivot within the body from one side wall to the other side wall so that the tungsten knocking member intermittently engages the side walls to generate the desired sound and vibration to attract fish.

BRIEF DESCRIPTION OF THE DRAWINGS

FIG. 1 is a side elevational view of a fishing lure having a composite weight;

FIG. 2a is a sectional side view of the fishing lure having a composite weight illustrated in FIG. 1;

FIG. 2b is a sectional side view of the fishing lure body illustrated in FIG. 2a, with the composite weight removed;

FIG. 3 is a side elevational view of the fishing lure illustrated in FIG. 1, with the composite weight being illustrated in phantom;

FIG. 4 is a sectional view of the fishing lure taken along lines 4-4 of FIG. 3;

FIG. 5 is a side elevational view of the composite weight;

FIG. 6 is a top plan view of the composite weight of FIG. 5;

FIG. 7 is an exploded side elevational view of the composite weight of FIG. 5; and FIG. 8 is an exploded front elevational view of the composite weight illustrated in FIG. 7.

DETAILED DESCRIPTION OF THE INVENTION

Looking at FIGS. 1-4, a fishing lure 10 is illustrated that generates a desired sound for attracting fish using a single composite weight 14. The fishing lure 10 has a partially hollow body or shell 12 that surrounds the composite weight 14. In particular, the body 12 has a forward end 16 and a rearward end 18, with two side walls 20, 22 positioned between the forward end 16 and the rearward end 18. The outer surfaces of the side walls 20, 22 are substantially mirror images of each other to provide a uniform outer body 12, with the interior portions of the side walls 20, 22 being designed to fittingly engage each other. That is, one side wall 20 has male connectors and the other side wall has female connectors to unite the two side walls 20, 22 in a single body 12. Each side wall 20, 22 additionally has an interior surface 24 that surrounds the composite weight 14. More specifically, a series of interior partitions or dividing walls 26 are connected to at least one of the side walls 20, 22 to define a series of chambers in the body 12 of the fishing lure 10. In the embodiment illustrated in FIGS. 2a and 2b, the body 12 has three interior partitions 26 that define four chambers: a first chamber 28 proximate said forward end 16, a second chamber 30 proximate said rearward end 18, a middle chamber 32 between the first and second chambers 28, 30, and an upper chamber 34 abutting the first chamber 28.

As illustrated in FIG. 2a, the composite weight 14 is positioned in the first chamber 28 at the forward end 16 of the fishing lure 10. The first chamber 28 has a shape commensurate with the shape of the composite weight 14, with the dimensions of the first chamber 28 being greater than those of the composite weight 14. The composite weight 14 is substantially triangularly-shaped (see FIG. 5), and includes a base member 36 and a tungsten knocking member 38 (see FIG. 7). The base member 36 in the embodiment described herein is made of lead, although other materials may be incorporated to adjust the sound of the lure 10. The base member 36 in the embodiment illustrated in FIGS. 5-8 includes two planar surfaces 39a, 39b that are separated by a base rocking surface 40a and side walls or edges 40b, 40c. The tungsten knocking member 38 is positioned at the uppermost edge of the base member 36 opposite said base rocking surface 40a, namely, at the junction of the side walls 40b, 40c of the base member 36. The composite weight 14 is positioned in the first chamber 28 of the body 12 with the base rocking surface 40a resting on the interior surface 24 of the body 12 to pivot in direction A (see FIG. 4). In the embodiment illustrated in FIG. 8, the base rocking surface 40a has substantially arcuate edges extending along the length of said base rocking surface 40a. As a result, with the tungsten knocking member 38 being at the top of the composite weight 14, the tungsten knocking member 38 will swing or pivot from side to side inside the lure body 12 in direction A as the fishing lure 10 is drawn through water. The pivoting action will cause the tungsten knocking member 38 to periodically engage the interior surfaces 24 of the side walls 20, 22, thereby generating the desired sound for attracting fish. Since the tungsten knocking member 38 is proportionally heavier than the base member 36, the swinging motion will occur at various retrieval speeds (including relatively slower speeds) while continuing to emit a sound when other similarly shaped lures will not make any sound for attracting fish.

Continuing to refer to FIGS. 5-8, the composite weight 14 is illustrated in greater detail. In the embodiment illustrated in FIG. 7, the tungsten knocking member 38 of the composite weight 14 is shown having a substantially cylindrical or barrel-shaped head portion 42 connected to a substantially quadrangular foot 44. Looking to FIGS. 6 and 8, the length L1 of the cylindrical head portion 42 is substantially perpendicular to the length L2 of the base rocking surface 40a. As a result, the cylindrical head portion 42 is shaped to engage the side walls 20, 22 as the composite weight 14 pivots on the base rocking surface 40a of the base member 36 (see FIG. 4).

Furthermore, the base member 36 substantially surrounds the foot 44 of the tungsten knocking member 38 to securely maintain the connection between the base member 36 and the tungsten knocking member 38. That is, in producing the composite weight 14, the tungsten knocking member 38 is cast first. The base member 36 may will then be molded over the foot 44 of the tungsten knocking member 38 to secure the connection between the members 36, 38, although other means for positioning the base member 36 around the tungsten knocking member 38 may be employed. While the foot 44 may take on shapes other than the substantially quadrangular shape shown in FIG. 7, the shape of the foot 44 should be such that the foot 44, once secured to said base member 36, will not be able to disengage or disconnect from the base member 36. In addition, although the base member 36 is described as being made of lead, it is noted that other materials lighter than tungsten may be used in conjunction with the tungsten knocking member 38 to produce the desired sound. That is, the base member 36 may be made of another metal or even have a plastic body to change the center of gravity of the composite weight 14 and transfer more impact from the tungsten knocking member 38 into the side walls 20, 22 of the fishing lure 10. Thus, using a tungsten knocking member 38 and casting or positioning another material around it will achieve a different tone.

In the embodiment shown in FIG. 7, the size or volume of the base member 36 is at least triple the volume of said tungsten knocking member 38. Since tungsten is heavier than lead, the weight and position of the tungsten knocking member 38 will direct the pivoting movement of the composite weight 14 when the fishing lure 10 is suspended in water. Furthermore, the shape of the composite weight 14, with the tungsten knocking member 38 positioned above the base member 36, allows that only a particular part of the tungsten knocking member 38 is exposed to obtain a certain sound emitted from a fishing lure 10. Although the composite weight 14 is illustrated in a generally triangular shape, it is noted that additional shapes for the composite weight 14, such as a quadrangle, circle, or oval, may be used to generate a similar sound for attracting fish. With such modifications, the first chamber 28 may be adjust similarly to direct the pivoting movement of the composite weight 14 in the lure body 12.

Furthermore, it is noted that tungsten is much harder and heavier than lead or steel. As a result, tungsten creates twice the sound of other weights (such as lead), and provides more vibration to help induce reaction strikes by fish. Furthermore, tungsten is more durable than other metals. For example, tungsten is two to three times more rigid than copper or steel. As a result, the tungsten knocking member 38 will not deform or flatten like a lead weight after repeated engagement with the side walls 20, 22, and tungsten knocking member 38 will retain its sound properties over time.

It is to be noted that another supplemental weight 33 may be included in the body 12 to balance of the fishing lure 10 with the composite weight 14 so that the fishing lure 10 will be retrieved in water in a substantially natural appearing fashion, as shown in FIG. 2a. The supplemental weight 33 in the embodiment illustrated is positioned in the middle chamber 32. The supplemental weight 33 is not used to create additional noise in the lure body 12; rather, it is used to stabilize the distribution of weight in the fishing lure 10.

Through testing the design described above, the tungsten knocking member 38 wrapped with the base member 36 emits a higher pitch tone that is not found by using other materials in fishing lures. The sound produced by this combination was found to produce fish strikes when other similarly-shaped fishing lures did not.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. An improved fishing lure used to attract fish through sound, said fishing lure comprising:
    a shell having a front end and a rear end, said shell including two side walls engaging each other to define an inner surface surrounding a front hollow region and a rear hollow region separated by an intermediate partition; and
    a composite weight comprising a knocking member comprising a first material of tungsten and a base member comprising a second material lighter than and different from said first material, said composite weight having two planar surfaces separated by a first side, a second side, and a third side, with said tungsten knocking member positioned substantially within the base member at the junction of said first side and said second side, said third side pivotally resting on said inner surface of said shell for said tungsten knocking member to intermittently engage said side walls of said shell to generate a desired noise.

2. The improved fishing lure as described in claim 1 wherein said tungsten member of said composite weight is harder than said base member of said composite weight.

3. The improved fishing lure as described in claim 1 wherein said base member of said composite weight comprises lead.

4. The improved fishing lure as described in claim 1 wherein said tungsten member includes a cylindrical head portion and a foot extending from said cylindrical head portion, said base member substantially surrounding said foot of said tungsten knocking member.

5. The improved fishing lure as described in claim 1 wherein said composite weight is substantially triangular.

6. The improved fishing lure as described in claim 1 wherein a volume of said base member is at least triple a volume of said tungsten member.

7. The improved fishing lure as described in claim 1 further comprising a supplemental weight mounted in said rear hollow region of said shell.

8. A fishing lure for attracting fish by generating a desired sound, said fishing lure comprising:
    a body having a forward end and a rearward end, with two side walls positioned between said forward end and said rearward end, each said side wall having a respective interior surface, said interior surfaces of said side walls define an interior surface of the body, said body defining a first chamber proximate said forward end and a second chamber proximate said rearward end, said first chamber separated from said second chamber by an interior partition; and
    a weight including a lead base member having a base rocking surface and a tungsten knocking member at least partially surrounded by said lead base member opposite said base rocking surface, said weight pivotally positioned in said first chamber of said body with said base rocking surface resting on said interior surface of said body for said tungsten knocking member to pivot from side to side to periodically engage said side walls to generate the sound for attracting fish.

9. The fishing lure as described in claim 8 wherein said tungsten knocking member includes a cylindrical head portion connected to a substantially quadrangular foot, a length of said cylindrical head portion being perpendicular to a length of said base rocking surface to engage said interior surfaces of said side walls.

10. The fishing lure as described in claim 9 wherein said lead base member substantially surrounds said foot of said tungsten knocking member.

11. The fishing lure as described in claim 8 wherein a volume of said lead base member is at least triple a volume of said tungsten knocking member.

12. The fishing lure as described in claim 8 wherein said base rocking surface has substantially arcuate edges along a length of said base rocking surface.

13. The fishing lure as described in claim 1 further comprising a supplemental weight in said second chamber.

14. The fishing lure as described in claim 1 wherein said weight is substantially triangularly-shaped.

15. An improved fishing lure used to attract fish through sound, said fishing lure comprising:

a shell having a front end and a rear end, said shell including two side walls engaging each other to define an inner surface surrounding a front hollow region and a rear hollow region separated by an intermediate dividing wall; and a weight comprising a tungsten knocking member and a base member substantially surrounding said knocking member, said composite weight having two planar surfaces separated by a first side, a second side, and a third side, with said tungsten knocking member positioned at a junction of said first side and said second side, said third side pivotally resting on said inner surface of said shell for said tungsten knocking member to intermittently engage said side walls of said shell to generate a desired noise;

wherein said tungsten member includes a substantially cylindrical head portion and a foot extending from said substantially cylindrical head portion, said base member substantially surrounding said foot of said tungsten knocking member.

* * * * *